(12) United States Patent
Rubat du Merac

(10) Patent No.: US 9,488,976 B2
(45) Date of Patent: Nov. 8, 2016

(54) DEVICE AND METHOD FOR DIAGNOSING AN EVOLUTIVE INDUSTRIAL PROCESS

(75) Inventor: Sylvain Rubat du Merac, Issoire (FR)

(73) Assignee: IP LEANWARE, Issoire (FR)

(*) Notice: Subject to any disclaimer, the term of this patent is extended or adjusted under 35 U.S.C. 154(b) by 467 days.

(21) Appl. No.: 14/234,759

(22) PCT Filed: Jul. 26, 2012

(86) PCT No.: PCT/IB2012/001436
§ 371 (c)(1),
(2), (4) Date: Apr. 10, 2014

(87) PCT Pub. No.: WO2013/014524
PCT Pub. Date: Jan. 31, 2013

(65) Prior Publication Data
US 2014/0228994 A1 Aug. 14, 2014

(30) Foreign Application Priority Data
Jul. 26, 2011 (FR) .................................. 1102324

(51) Int. Cl.
G06F 19/00 (2011.01)
G05B 19/418 (2006.01)
G06Q 10/04 (2012.01)

(52) U.S. Cl.
CPC ......... *G05B 19/41875* (2013.01); *G06Q 10/04* (2013.01); *G05B 2219/2609* (2013.01); *G05B 2219/31455* (2013.01); *Y02P 90/14* (2015.11); *Y02P 90/22* (2015.11)

(58) Field of Classification Search
CPC .............................................. G05B 19/41875
USPC .................................................... 700/95–112
See application file for complete search history.

(56) References Cited

U.S. PATENT DOCUMENTS

| 5,764,518 A * | 6/1998 | Collins | .................. | B25J 9/1617 |
| | | | | 700/117 |
| 8,117,007 B2 * | 2/2012 | Yitbarek | ................ | G06Q 10/06 |
| | | | | 701/29.4 |

(Continued)

FOREIGN PATENT DOCUMENTS

| FR | 2692037 A1 | 12/1993 |
| FR | 2827055 A1 | 1/2003 |

OTHER PUBLICATIONS

Wei, Donghong, et al. "Performance analysis and optimization of organic Rankine cycle (ORC) for waste heat recovery." Energy conversion and Management 48.4 (2007): pp. 1113-1119.*

(Continued)

*Primary Examiner* — Satish Rampuria
(74) *Attorney, Agent, or Firm* — Thomas & Karceski P.C.

(57) ABSTRACT

A device for diagnosing an evolutive industrial process comprise a plurality of technical steps for the production of a given industrial compound, for which a plurality of state or characterization technical data is available, the device including at least one microprocessor and one memory, an interface module, a counter module for verifying whether a calculation end criterion has been reached, a management module for managing operations and data exchanges between the different modules, a computational grid comprising a plurality of production window calculation modules in order to determine appropriate production windows, a clustering module for distributing parameter combinations between several clusters in order to perform convergence calculations, and a convergence module for verifying whether an expected convergence rate between clusters has been reached.

15 Claims, 7 Drawing Sheets

(56) References Cited

U.S. PATENT DOCUMENTS

| | | | |
|---|---|---|---|
| 2006/0053039 A1* | 3/2006 | Gamarnik | G06Q 10/04 705/7.37 |
| 2006/0168013 A1* | 7/2006 | Wilson | G05B 19/4184 709/206 |
| 2011/0227926 A1* | 9/2011 | Tjhi | G06Q 10/06 345/440 |

OTHER PUBLICATIONS

Ang, Kiam Heong, Gregory Chong, and Yun Li. "PID control system analysis, design, and technology." Control Systems Technology, IEEE Transactions on 13.4 (2005): pp. 559-576.*

Kadam, J., et al. "Towards integrated dynamic real-time optimization and control of industrial processes." Proceedings foundations of computer-aided process operations (FOCAPO2003) (2003): pp. 593-596.*

H.O. Gaillard, "Braincube performance system introduction", Papercon 09, Jun. 2, 2009, p. 1-11.

Baumgartner C et al., "Subspace Selection for Clustering High-Dimensional Data", Proceedings of 4th IEEE Int'l Conf. on Data Mining, Nov. 1, 2004, p. 1-8.

Rudiger Brause, "Real-Valued Feature Selection by Mutual Information of Order 2", 21st IEEE Int'l Conf. on Tools w/ Artificial Intelligence, Nov. 2, 2009, pp. 597-604.

Lei-Hong Gao et al., "Data mining on a kind of complex industrial process", Proceedings of the 2nd IEEE Int'l Conf. on Machine Learning and Cybernetics, Nov. 2, 2003, p. 105-107.

Stankovski et al., "Special section: Data mining in grid computing environments", Future Gen. Computer Systems, vol. 23, No. 1, Jan. 1, 2007, p. 31-33.

Eugenio Cesario et al., "From Parallel Data Mining to Grid-Enabled Distrubuted Knowledge Discovery", Lecture Notes, Springer Berlin Heidelberg, pp. 25-36, May 14, 2007.

International Search Report dated Sep. 10, 2012 for International Patent Application No. PCT/IB2012/001436.

\* cited by examiner

DEVICE AND METHOD FOR DIAGNOSING AN EVOLUTIVE INDUSTRIAL PROCESS

CROSS-REFERENCE TO RELATED APPLICATION(S)

This is a National Stage Entry into the United States Patent and Trademark Office from International PCT Patent Application No PCT/IB2012/001436 having an international filing date Jul. 26, 2011, which claims priority to French Patent Application No. FR 1102324, filed Jul. 26, 2011, the entire contents of both of witch are incorporated herein by reference.

TECHNICAL FIELD OF THE INVENTION

The present invention relates to a method for automatically characterizing a process for manufacturing an industrial compound. It also relates to a device for automatically characterizing a process for manufacturing an industrial compound.

PRIOR ART

Many types of diagnosis methods are known for interpreting or analyzing the data from an industrial process in view of improving said process or identifying occasional or chronic malfunctions.

For example, document FR 2 692 037 describes a method for establishing a reference state and a current state for an industrial process based on measured physical quantities, wherein all pieces of equipment of said process are employed. These two states are compared quantity by quantity, using fuzzy logic in order to classify the quantities, and a diagnosis is made using expert rules. In order to make a comparison between both states, the method requires that a reference state be available, in which the process is deemed to progress normally. However, reliable data related this state has not been always available. This state may furthermore vary widely depending on the conditions of use, making it virtually impossible to derive a prior knowledge of the reference state. Furthermore, when the reference state is acquired through training, the reliability of the result is uncertain. As a consequence, the outcome of the subsequent comparison cannot guarantee the reliability of the conclusion. A more reliable and more constant approach is therefore desirable.

Document FR 2 827 055 relates to a configuration management method describing a set of objects each representing a function or describing a method for implementing a configuration of said product. A database provides an accurate definition of each object with its interrelations with other objects in order to create a set of constraint rules. This database is used to refer to interactively and dynamically when selecting options. This method is useful for organizing and scheduling a production process in which the parameters of the object to generate are liable to vary strongly from one product to the next, as in the case, for example, of an aircraft assembly line. This method, however, has not been appropriate for processes in which high stability and uniformity of the produced result is sought. Additionally, for a continuous process, such as for the production of paper, chemicals, alloys or other materials, the described method has not been suitable.

Document BAUMGARTNER C AND AL: "Subspace Selection for Clustering High Dimensional Data", DATA MINING, 2004. ICDM 2004. PROCEEDINGS FOURTH IEEE INTERNATIONAL CONFERENCE ON BRIGHTON, UK 1-4 Nov. 2004, PISCATAWAY, NJ, USA, IEEE, 1 Nov. 2004, pages 11-18, describes a clustering algorithm known as "SURFING" (for "SUbspace Relevant For clusterING"), which allows the set of subspaces of interest for clustering to be identified and sorts them by relevance. Sorting is based on quality criteria relating to the relevance of a subspace using the distances of the k nearest neighboring objects. Since this approach requires virtually no parameter, it allows the unsupervised aspect of clustering to be managed in an advantageous manner. This document teaches a method for classifying parameter combinations into 3 clusters: "Relevant", "neutral" and "irrelevant". These three clusters are strictly different (that is, their intersection is empty), so that there may not be any convergence, whatsoever. Furthermore, the described method, or the those (CLIQUE and RIS) mentioned in the document, suggest that the data follow a determined path and that the convergence towards a solution is based on successive eliminations rather than a stochastic path providing access to any combination of parameters, while ensuring convergence towards a repeatable solution.

Document RUDIGER BRAUSE: "Real-valued Feature Selection by Mutual Information of Order 2" TOOLS WITH ARTIFICIAL INTELLIGENCE, 2009. ICTAI '09. 21ST INTERNATIONAL CONFERENCE ON, IEEE, PISCATAWAY, NJ, USA, 2 Nov. 2009, pages 597-604, describes a solution for selecting characteristics for clustering, classification and approximation purposes. For real-valued characteristics, the document teaches how the selection of characteristics for a large number of characteristics may be implemented based on mutual information. Rènyl's second order mutual information approach is used to refer to as a calculation basis to calculate joint probabilities along several dimensions comprising only a few examples. This approach is based solely on mutual information in order to rank the relevance of a parameter rather than considering an optimization function.

This document is based on a highly computationally intensive algorithm (an algorithm which follows the principle of performing a step-by-step local optimum selection, in the hope of obtaining a globally optimum result), taking the parameters into account one by one and not taking parameter combinations into account, thus excluding most of the combinations taken into account by the method according to the present invention. The example given includes 14 parameters and 3,700 data items, whereas the approach according to the present invention advantageously allows at least 10,000 times greater volumes of data to be processed. Finally, this document does not use a computational grid (g).

The present invention provides various technical means to overcome these drawbacks.

SUMMARY OF THE INVENTION

Firstly, a first object of the present invention is to provide a method for automatically characterizing a process for manufacturing an industrial compound, allowing the production windows to be identified in a reliable and stable manner, thus allowing improved results to be obtained.

Another object of the present invention is to provide a method for automatically characterizing a process for manufacturing an industrial compound, which may be used with a continuous process.

Another object of the present invention is to provide a method for automatically characterizing a process for manufacturing an industrial compound, which may be used with a process involving a very large number of data to be processed.

Another object of the present invention is to provide a method for automatically characterizing a process for manufacturing an industrial compound allowing production windows to be identified in a reliable and stable manner without excluding any possible solution.

To this end, the present invention provides a method for automatically characterizing a process for manufacturing an industrial compound, wherein a plurality of technical data relating to the process state and/or a process material and/or a process performance is available, comprising the steps of:

a) measuring, on an object manufacturing line having one characterization, using measurement means, a plurality of data relating to a plurality of parameters related to the process state and/or a process material and/or a process performance;
b) receiving, by means of an interface module of an automatic characterization device, said data;
c) receiving, by means of an interface module of an automatic characterization device, at least one of the parameters as a target improvement of the manufacturing method;
d) receiving, by means of an interface module of an automatic characterization device, a process optimization function;
e) performing, by means of a computational grid comprising a plurality of processors, for a period which is determined by a calculation end criterion, a first characterization phase of the relevant manufacturing method in order to achieve characteristics of potential manufacturing windows;
f) based on the characteristics of the best manufacturing windows obtained in the first characterization phase of the relevant manufacturing method related to the received optimization function, determining, by means of a window selection threshold determination module of an automatic characterization device, a manufacturing window selection threshold;
g) performing, by means of a computational grid, a second characterization phase of the relevant manufacturing method in order to achieve parameter combinations for manufacturing windows located within the limits of the established threshold;
h) distributing, by means of a clustering module of an automatic characterization device, the parameter combinations among several combination clusters;
i) checking, by means of a convergence module of an automatic characterization device, the convergence rate between clusters according to a target rate;
j) if the target rate has not been reached, the method continues to step "g";
k) if the target rate has been reached, obtaining the variation ranges of the manufacturing window parameters of the relevant manufacturing method, which meet the convergence criterion.

Unlike conventional approaches, which aim to minimize the number of calculations to be performed, thus eliminating a certain number of potential solutions from the outset, the approach according to the present invention is such that all potentially useful configurations are taken into account in the process, with an unsupervised calculation mode. For example, the method allows window parameter bounds to be obtained such as "the temperature is in the range between 10 and 20° C. and the pressure is in the range between 1 and 2 Bars". For numerical parameters, the bounds or limits within which the values are acceptable are preferably obtained. For parameters with discrete values, authorized discrete values or modes (e.g., equipment A or B or C) are preferably obtained. Convergence leads to identical solutions if calculations are performed several times with the same data, and to physical stability in the considered industrial process.

Such an approach allows a particularly large number of data items to be taken into account, so as that it is adapted to most present-day industrial processes, which often involve a very large number of parameters, each with numerous data items. For example, in a paper manufacturing method, it is possible to find between 800 and 5,000 parameters, or even more, and between 1,000 and 500,000 data items, or even more. Thanks to computational grids comprising, for example, 80 processors clocked at 2.4 GHz, the device according to the present invention allows calculations to be performed, which converge in a few tens of minutes for data quantities such as those mentioned above. Thus, the device ensures that data or potential solutions are not excluded. The disclosed method is advantageously performed with no a priori conditions concerning the data to be processed with a device, such as that disclosed below.

Advantageously, at least one portion of the calculations to be performed is distributed (or fragmented) over a plurality of computers that are linked together (the distribution is advantageously performed by means of a fragmentation module on a computational grid).

The method advantageously makes use of a high computational capacity, so as to take a very large number of operations into account. Thanks to the method according to the present invention, the fragmented calculations performed by the grid are unsupervised, and the grid is naturally balanced. No learning mode will suggest certain window types rather than other types. The performance of a very large number of operations allows a maximum number of cases to be taken into account, without any a priori condition, for greater final accuracy.

According to an advantageous embodiment, the calculations are unsupervised. Each module may serve as the management module. It is also possible to provide several management modules, each with its own specificity.

According to another advantageous embodiment, the computational grid is scalable, which allows it to take advantage of the flexibility of a Cloud-based architecture. This feature allows one or several modules to added (or removed) without affecting the other modules.

These features are particularly advantageous because in conventional supervised management, a central processing unit controls the entire system through a centralized decision method. This approach offers little flexibility and scalability. According to the present invention, a local management mode is advantageously provided, for example by requesting their availability from other elements of the grid. The available element(s) at the time of a request is/are used to distribute the calculations. Thus, several managers may be present at the same time. Any element of the grid may be a manager at any given time. The system is naturally balanced in terms of workload and therefore, may not delegate operations, which would disorganize the grid, to a single member. Finally, this scalable mode allows the grid architecture to be modified at any given time without interrupting its operation.

According to another alternative embodiment, the optimization function comprises the lift to be maximized.

Depending on yet another embodiment, the optimization function comprises the average of the target value (to be minimized or maximized as appropriate). Alternatively, the criterion also comprises the standard deviation.

Depending on yet another alternative embodiment, the optimization function comprises the "odds ratio" to be maximized.

Advantageously, a calculation end criterion is previously defined (fixed and not user-accessible or adjustable).

In another alternative embodiment, the method includes a step for receiving a calculation end criterion.

According to an advantageous embodiment, the determination of a window selection threshold is performed automatically by a threshold determination module, which receives the characteristics of the potential windows and returns at least one value for the window selection threshold.

Such a step allows the determination mode of a window selection threshold to be managed automatically. All potential windows may be considered.

According to another embodiment, after the first fragmented calculation phase, using an interface module, the characteristics of the potential windows are provided and at least one value of the window selection threshold is received in return by means of the interface module. Such a step allows for an external process to be involved in the determination of a window selection threshold.

In another alternative embodiment, the method includes a step for designating one of the computers as a management module in the calculation process.

The fragmented calculation phases advantageously take place at least partially concurrently.

The present invention furthermore provides a device for automatically characterizing an evolutive industrial process for implementing the above-described method, comprising a plurality of technical steps for the production of a given industrial compound, for which a plurality of state or characterization technical data is available, the device comprising:
- at least one microprocessor and one memory;
- an interface module, for receiving and transmitting the data;
- a counter module, for checking whether a calculation end criterion has been reached, and stopping the calculations when it has been reached;
- a management module, for managing operations and data exchanges between the different modules;
- a computational grid, comprising a plurality of production window calculation modules, for carrying out in parallel, in a substantially short period of time, a substantially large number of operations on a substantially large number of data items from the industrial process to be diagnosed, in order to determine appropriate production windows;
- a window selection threshold determination module, for determining a threshold based on which the potential windows are retained in a second fragmented calculation phase;
- a clustering module, for distributing parameter combinations among several clusters in order to perform convergence calculations;
- a convergence module, for verifying whether an expected convergence rate between clusters has been reached.

According to an advantageous embodiment, the calculations are unsupervised. Each module may serve as the management module. It is also possible to provide several management modules, each with its own specificity.

According to another advantageous embodiment, the computational grid is scalable, which allows it to take advantage of the flexibility of a Cloud-based architecture. This feature allows one or several modules to added (or removed) without affecting the other modules.

In an equally advantageous manner, a grid includes at least one node, to which a plurality of microprocessors are associated. A grid preferably includes a plurality of nodes and a plurality of microprocessors.

Depending on yet another embodiment, the diagnosis device further comprises a fragmentation module, for allocating the calculations to be performed among a plurality of production window calculation modules. The fragmentation module is advantageously provided in a supervisor module. The module sends calculation requests when necessary to the other available modules, which accept or do not accept a request depending on their availability.

DESCRIPTION OF FIGURES

All implementation details are given in the following description, with reference to FIGS. 1 à 10, presented solely for the purpose of providing non-limiting examples and in which.

DETAILED DESCRIPTION OF THE PRESENT INVENTION

Overview of the Method

The automatic characterization device and method described hereinafter allow technical diagnoses to be established for complex industrial processes, which furthermore involve a very large number of data items to be processed. They can additionally be applied for the purposes of process monitoring, finding more appropriate operational conditions from a qualitative and/or quantitative point of view, and allowing the subsequent cycles to be carried out under optimum conditions. Numerous processes may be subjected to such diagnoses or characterizations, in particular in those industrial fields in which products are manufactured or prepared by means of continuous processes since in the production of paper, chemicals such as paint, various alloys or materials, etc. Other types of process, even of the batch type, can also be subjected to characterizations. Changing processes, in which the raw materials are processed or mixed together step by step, in order to gradually prepare and progressively achieve an end product or mixture between the beginning and the end of the process, are particularly suitable for such characterizations.

An industrial process may be described by many parameters. Some of them characterize the state of the process: these are physical quantities (temperatures, pressures, powers, etc.) or state variables (valve positions, types of production, etc.), or the information on the material or environment of the process. Others characterize the performance of the process: hourly productivity, scrap rate, product quality, rejection rate, consumption, incidents, etc.

Figure 1:
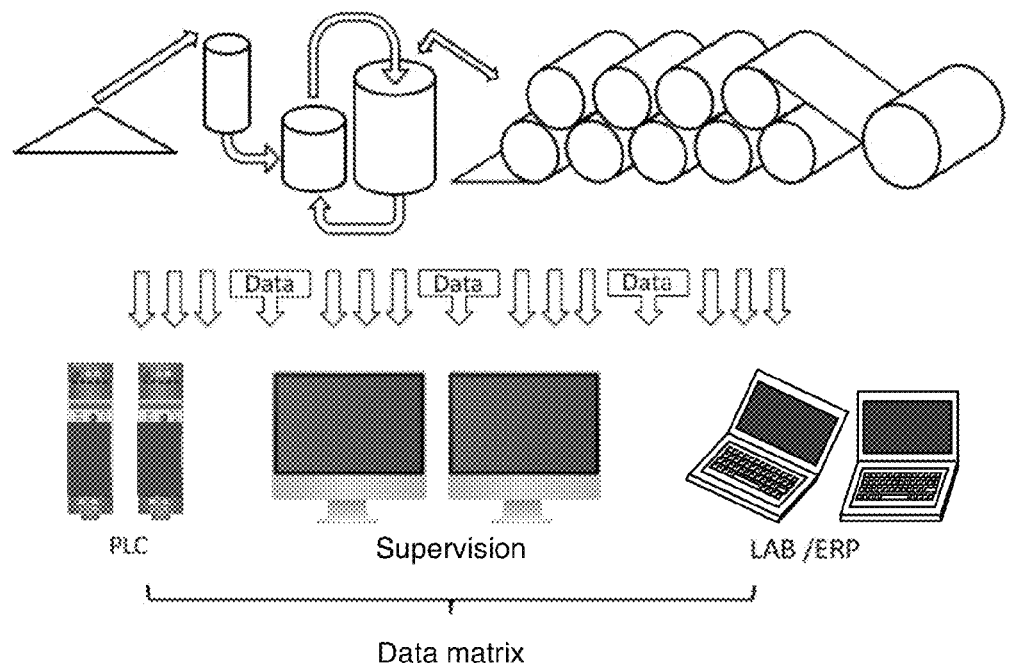
FIG. 1 is a schematic view of an example of an industrial process that may be diagnosed by means of the method and device according to the present invention.

FIG. 1 schematically shows an example of a continuous industrial process which may be improved by means of an automatic characterization method according to the present invention.

The aim here is to improve the performance of the industrial process. For this purpose, the values corresponding to each of the variable parameters of the process are collected in the form of data samples. It is possible to arrange the data in a matrix form in such a way that one line of the matrix contains a set of mutually consistent data and that each column contains the data of a variable describing the process. In the example of FIG. 1, a paper production process is represented schematically. The material is first subjected to a number of mixing operations, under specific temperature and pressure conditions. At the end of the process, its shaping into rolls allows the produced paper to be easily stored and conveyed, before it is subjected to any other more specific shaping operations. Production machines are often provided with means for sensing and measuring the production-related parameters. Known electronic and/or computing means furthermore allow the parameters to be recovered and stored. In a complex industrial process such as paper production, the number of parameters and data items thus recovered and stored in memory is quite substantial. Arranging the data in matrix form is advantageously performed to make their handling easier.

In the illustrated example, each paper roll is characterized by a set of parameters related to its quality (brightness, thickness, strength, etc.) and to its production (velocities, strain, concentrations, etc.). In the Table below, a line of data provides all of the quality parameters related to the parameters describing the process state that has resulted in this quality.

| Batch No | Velocity | Strain | Concentration | Brightness | Thickness | Strength | ... |
|---|---|---|---|---|---|---|---|
| 1 | 1230 | 14.785 | 0.04528 | 23.251 | 0.09523 | 1.215478996 | |
| 2 | 1234 | 15.234 | 0.05236 | 27.123 | 0.10235 | 0.845214587 | |
| 3 | 1228 | 13.256 | 0.05214 | 21.253 | 0.08852 | 1.235215458 | |

Figure 2:
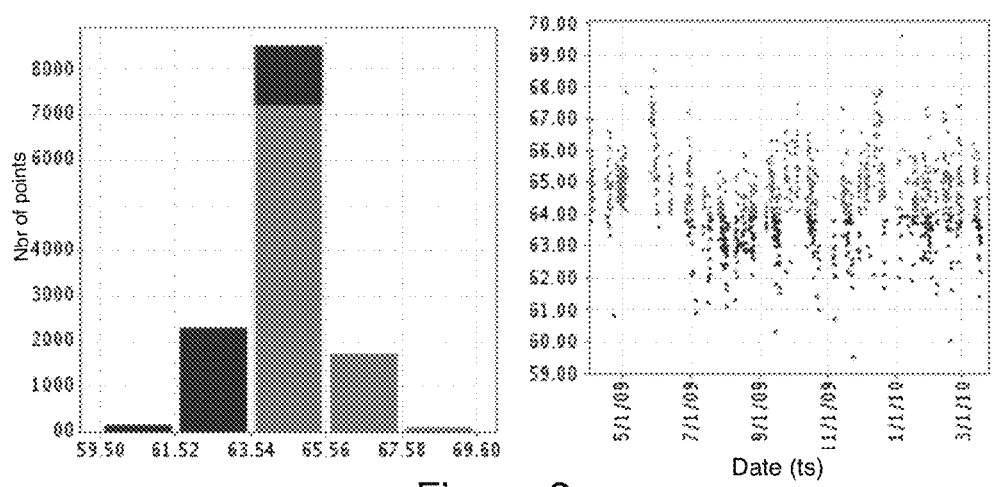
FIG. 2 shows graphs which represent examples of areas with values of a parameter to be reproduced (light gray) or avoided (dark gray)

Among all of the parameters, one parameter, referred to as the "target improvement", which must be caused to change, is determined. It is sought to reduce the variability of this parameter in order to improve the performance of the method, in this example a paper manufacturing method. By reducing the variation range of the value of the target improvement, an area to be reproduced and an area to be avoided are defined, thus creating three line categories among those of the data matrix:

- lines for which the target improvement is undefined;
- lines for which the target improvement belongs to the area to be reproduced: the line of data is then considered to be good (light gray area in FIG. 2);
- lines for which the target improvement belongs to the area to be avoided: the line of data is then qualified as being bad (dark gray area in FIG. 2).

The automatic characterization method according to the present invention allows for automatic analysis of the production data in order to determine production windows resulting in maximization of the proportion of good productions in the above-defined sense (so-called over-performing configurations). The diagnosis result thus allows the investigated process to be carried out under more favorable conditions.

A production window is a combination of a few parameters with, for each of said parameters, an allowed variation range (characterized by a lower limit and an upper limit for a numerical variable or a list of allowed values in the case of a discrete variable).

The term "lift" is used to designate the ratio of the proportion of good productions within a production window with respect to the proportion of good productions for all of the data.

If a production window contains 75% of good productions whereas the starting population contains 25% of these, then the lift of the production window is 3.

The obtained production windows may be implemented operationally so as to repeat the past observed over-performance.

Hardware Architecture

Figure 5:
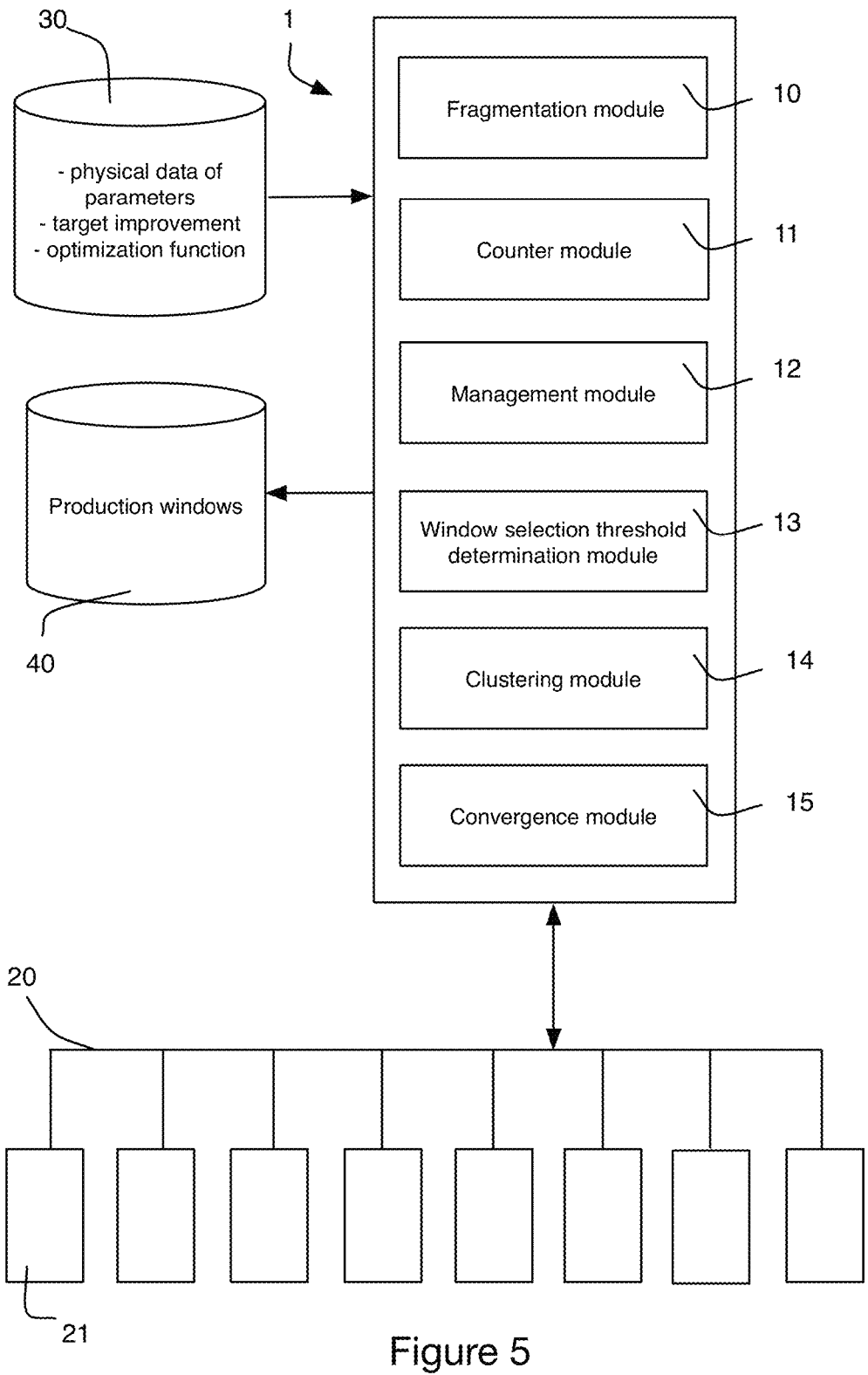
FIG. 5 schematically shows details of an example of a calculation module in a grid.

FIG. 5 illustrates an example of a hardware architecture which is particularly useful for implementing the method according to the present invention.

The automatic characterization device 1 according to the present invention includes a series of modules each having one or several specific functions. A fragmentation module 10 is intended for fragmenting or allocating or distributing the calculations to be performed in the multiple calculation modules 21 of the computational grid 20. A counter module 11 allows window calculations to be stopped depending on one or several stopping criteria such as, for example, a calculation time (for example three minutes, or the like) or a number of operations, or the like. A management module 12 allows the method's steps, calculations to be performed, data flows, resources, and obtained results to be managed and coordinated.

A window selection threshold determination module 13 allows a threshold to be established based on which the production windows may be considered for a second calculation phase. The threshold is determined as a function of the results of the first calculation phase. A clustering module 14 allows the results of the phase II calculations to be allocated into at least two clusters, for a convergence phase for which a convergence module 15 is provided, so that the convergence tests between clusters can be performed depending on specifically defined criteria. Thanks to this module and to the convergence phase, stable, constant and reliable results are obtained.

The data employed in the method are advantageously maintained in one or several databases such as bases 30 and 40. Base 30 is advantageously dedicated to the input parameters, target improvements and optimization functions. Base 40 is advantageously dedicated to data relating to the production windows, both for the intermediate calculation data and for the final results that are sought. Bases 30 and 40 may be combined and/or provided remotely or locally.

Although modules 10 to 15 are represented schematically as being clustered and exterior to grid 20, these modules are advantageously provided in each calculation module 21 of grid 20, including management module 12, which coordinates all of the steps of the method in such a way that each calculation module may manage one or several calculation sequences, whatever the activity of the other modules in the grid.

FIG. 5 shows an example of a module architecture. The architecture may vary depending, for example, on the combinations of certain modules that may be used. Thus, for example, management module 12 and counter module 11 may be combined into a single module. Clustering module 14 and convergence module 15 may also be combined together, but counter module 11 may or may not be arranged within each of modules 21 of the computational grid 20.

Figure 6:
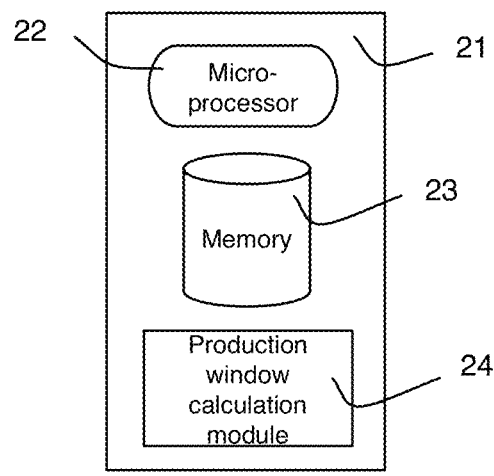
FIG. 6 is a schematic view of an example of a diagnosis device according to the present invention.

FIG. 6 schematically illustrates a calculation module 21 of grid 20. A module includes at least one microprocessor 22, at least one memory module 23 and at least one production window calculation module 24.

Computational Grid

The calculations involved in the method according to the present invention are often highly intensive depending on the number of lines and columns in the databases being processed. For efficient processing, these are allocated within a grid 20 comprising several nodes that are physically distributed over a computer network. Each node is capable of:

generating production windows through delegation to a configurable number of computing processes that are attached to it;
   controlling an entire calculation sequence by consolidating the results of calculations delegated to the other nodes.

Figure 4:
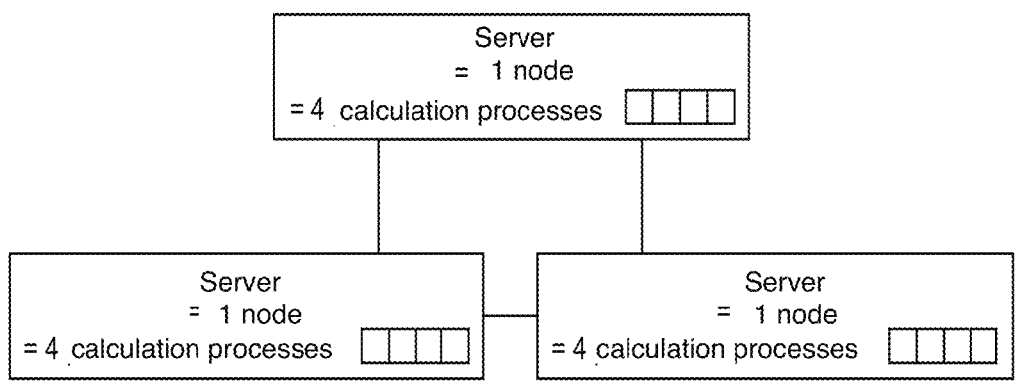
FIG. 4 schematically shows an example of a computational grid.

FIG. 4 shows an example grid comprising three nodes, each with four computing processes. The states of the calculation processes attached to each node are known to the latter, in particular, the number of unoccupied processes. An entire calculation sequence may be distributed, for example, as follows: a number of calculation fragments is formed, which is proportional to the number of basis points to be investigated and to the logarithm of half of the number of dimensions. Each fragment is subjected to a calculation run on a grid node. The same number of fragments can be used in each phase of the entire calculation job. For each phase of the calculation job, the main node provides the other nodes with the calculation fragments. The nodes continuously and sequentially query the other nodes (since they know their list) in order to derive fragments for their unoccupied computing processes: as a result, they derive fragments as soon as a node distributes a job.

Thus, the distribution of fragments is done according to a process controlled by the grid nodes, thus allowing for natural load balancing and maximum usage of the available calculation resources. Each computing process performs its calculations for a fixed period of time (for example three minutes) and then returns the results to the main node in which they are consolidated.

A grid may be completed virally, by simply establishing a relation between a new node and any one of the pre-existing nodes.

The implementation of the different afore-described modules (for example modules 10, 11, 12. 13, 14, 15, 20) is advantageously performed by means of implementation instructions, allowing the modules to perform the operation(s) specifically intended for the relevant module. The instructions may be in the form of one or several pieces of software or software modules implemented by one or several microprocessors. The module(s) and/or piece(s) of software is/are advantageously provided in a computer program product comprising a recording carrier or recording medium usable by one or several computers and including a computer-readable program code integrated within said carrier or medium, allowing application software to be run on a computer or other device comprising a microprocessor.

Steps of the Method

Figure 7:
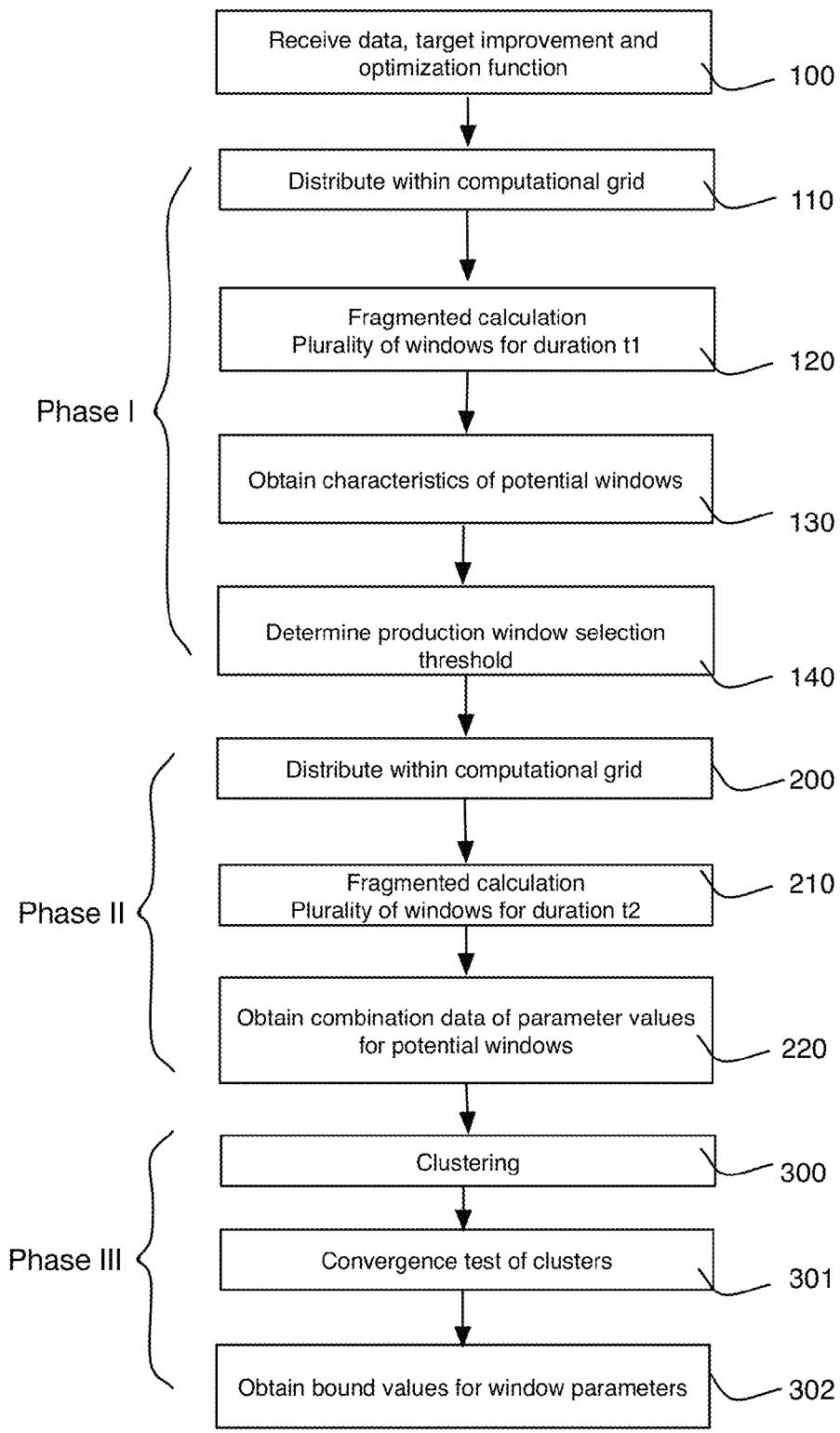
FIG. 7 shows a block-diagram of the main steps and phases of the method according to the present invention.
Figure 8:
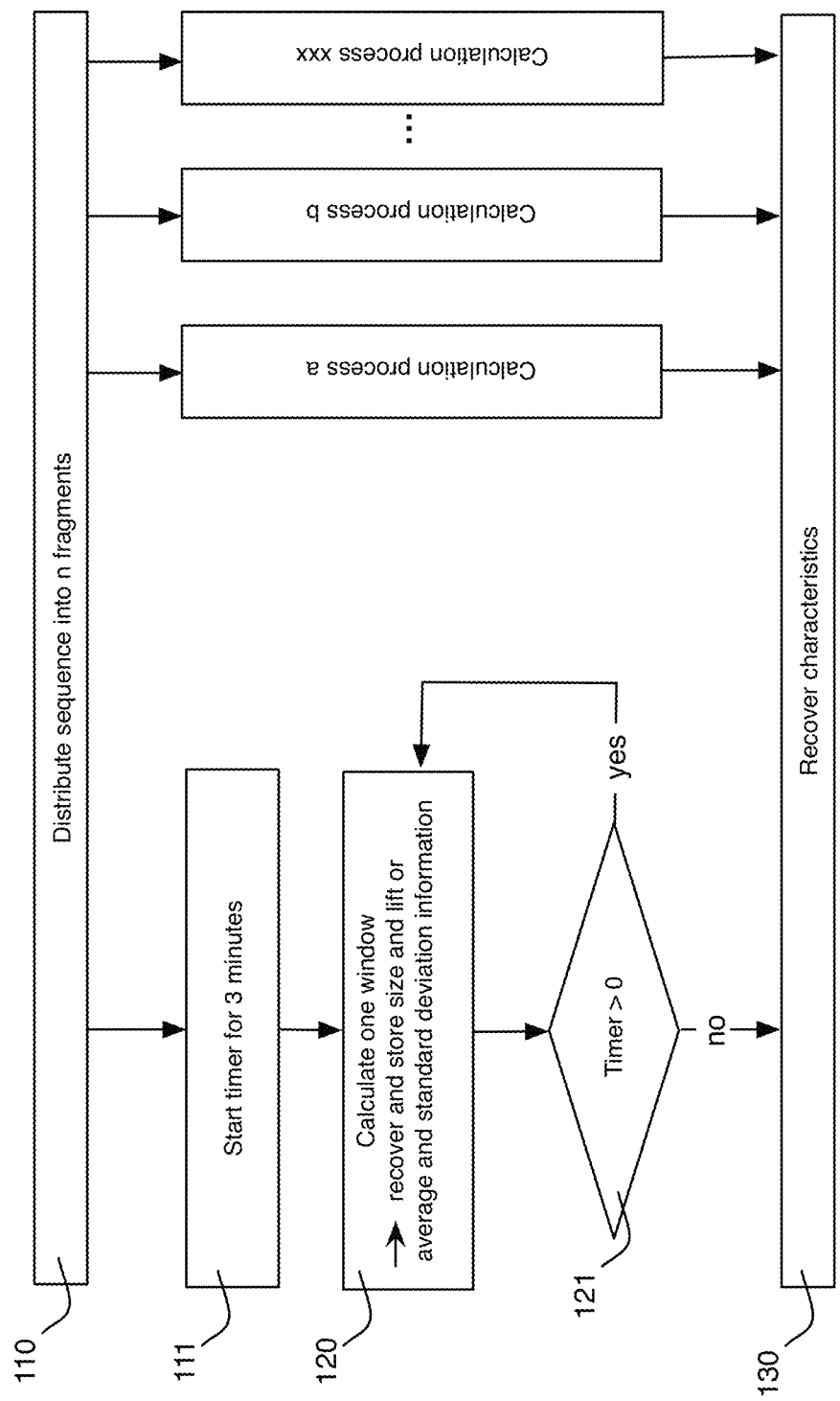
FIG. 8 shows a block-diagram of a detailed representation of the steps of phase I.
Figure 9:
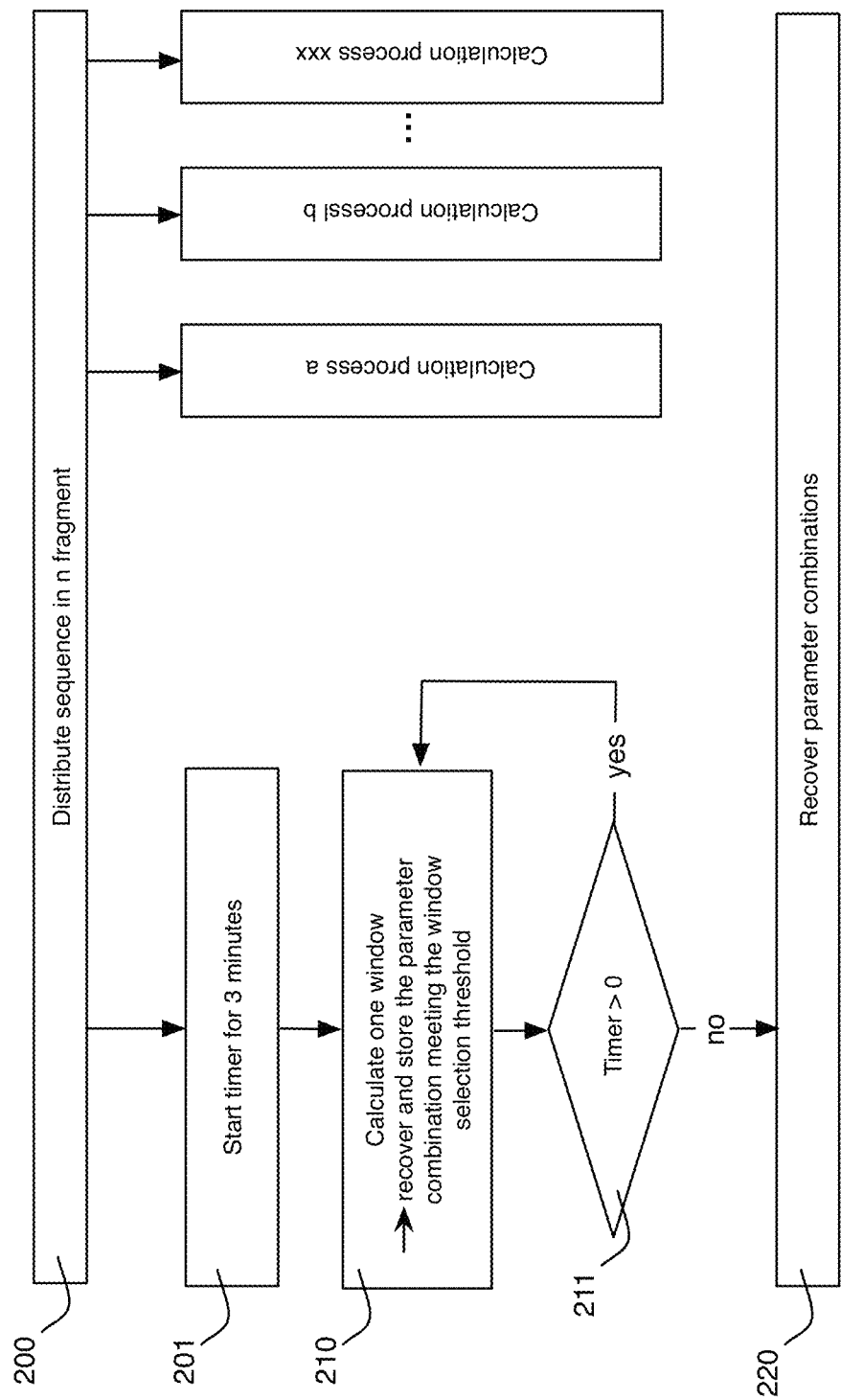
FIG. 9 shows a block-diagram of a detailed representation of the steps of phase II.

FIGS. 7 to 9 illustrate, in block diagram form, the different key steps of the method according to the present invention.

The determination of the over-performing production windows proceeds according to three main automatic steps, to which a pre-step (preparatory phase) may be added. This preparatory phase consists in deleting lines from the data sets, for which the value of the target improvement has not been defined.

FIG. 7 shows the three phases of the method. In step 100, the parameter data, target improvement and optimization function are received from a database 30. In steps 110 and 120, which may be merged together, the calculations are distributed within grid 20, for example by a fragmentation module 10, and the fragmented calculations of a plurality of windows are performed until a given end criterion has been reached. Counter module 11 can check that the established criterion, for example, the time or a given number of operations, etc., has been reached. In each node, the calculations are unsupervised and are performed in a stochastic manner. Management module 12 is provided in order to ensure correct progress of the calculation operations. In step 130, the characteristics of the potential windows are obtained. Depending on said characteristics, a production window selection threshold is determined in step 140 by the window selection threshold determination module 13.

FIG. 8 shows an embodiment of phase I in more detail. After the calculations have been divided into a plurality of calculation processes in step 110, counter module 11 is started in step 111, for three minutes in this example. In step 120, performed in a loop, a plurality of windows are calculated consecutively by means of the production window calculation modules 24 by recovering the corresponding size and lift data, for as long as the calculation end threshold has not been reached (step 121). In step 130, the window characteristics are obtained. The calculation process is conducted in a stochastic manner. It is based on the creation of an original window based on two lines of chosen randomly good data. The window is then widened by random deletion of variables from the list of constraints. Finally, the bounds or modes of each variable, taken in turn in a random order, are widened in order to generate a sequence of production windows of increasing size.

For phase II, in step 200, the calculations to be performed are distributed by a fragmentation module 10 within grid 20, and the fragmented calculations of a plurality of windows are performed in step 210. These two steps may be combined together. The calculations are unsupervised and are stopped when a stopping threshold, checked by a counter module 11, has been reached. In step 220, the parameter combinations for potential production windows are obtained.

FIG. 9 shows phase II in more detail. After the calculations have been divided into a plurality of calculation processes in step 200, a counter module is started in step 201. In step 210, performed in a loop in grid 20, a plurality of windows are calculated consecutively by means of production window calculation modules 24, by recovering parameter combinations which meet the established selection threshold, for as long as the calculation stopping threshold has not been reached (step 211). In step 220, the parameter combinations which meet the threshold are obtained. As in step I, the process is conducted in a stochastic manner. It is based on the creation of an original window based on at least two lines of randomly chosen good data. The window is then widened by random deletion of variables from the list of constraints. Finally, the bounds or modes of each variable taken in turn in a random order are widened in order to generate a sequence of production windows of increasing size while meeting the optimization target depending on the optimization function.

In phase III, the combination data is clustered in step 300 by a clustering module 14. Two or more clusters are thus formed. In step 301, a convergence test of the clusters is performed by a convergence module 15. Phase II is repeated until a predefined convergence rate has been achieved. In step 302, the values of the allowed bounds or modes of the parameters of the resulting over-performing production windows are obtained.

Search According to the Average or Median

Figure 10:
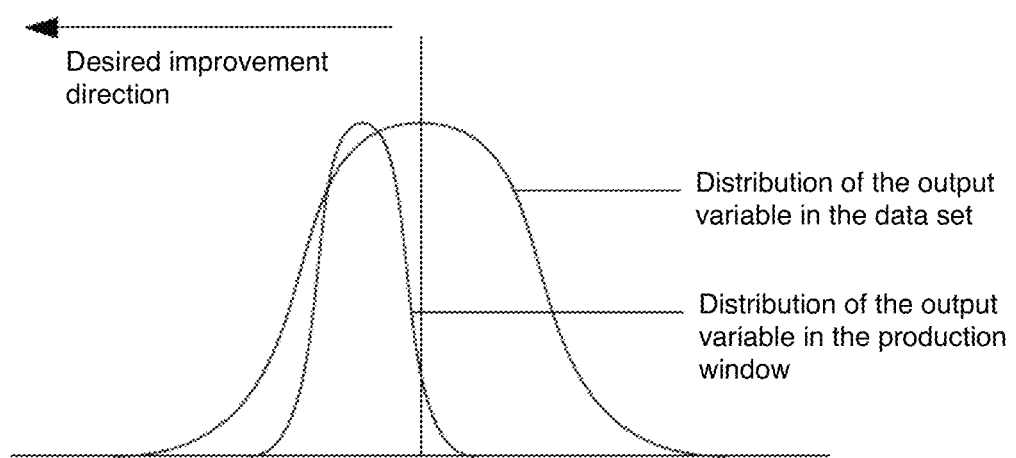
FIG. 10 shows an example of the distribution of the target improvement variable for the purpose of a diagnosis depending on the average.

It is possible to develop versions of the aforementioned mechanism which perform the search according to the average or median. The categorization approach is particularly well suited when a target area is imposed, for example according to a client specification for a given quality. It may also be desired to improve, without any specific numerical objective, the average or median of the target improvement. In this case, the improvement direction is decided (decrease or increase of the average), as shown in the example of FIG. 10, and the proposed method allows for automatic analysis of the production data in order to determine production windows in which the average or median of the target improvement is shifted in the desired direction with respect to the entire data set (over-performing configurations).

EXAMPLE

For example, a process, such as that shown in FIG. 1 will be considered, in which it is desired to manufacture a type of paper which, in particular, has a sufficient mechanical strength with respect to a set of specifications. To achieve this goal, a fiber of high quality but which significantly increases costs, is incorporated into the pulp. The amount of high quality pulp to be incorporated in order to achieve the desired strength varies over time. A production window which would allow to reduce, or even eliminate the use of high quality fibers is sought. The mechanical strength will therefore be obtained, with standard pulp, by acting upon the intrinsic parameters of the manufacturing method, which may lead to considerable cost savings.

First Phase: Distributed Calculations

A massive calculation of production windows is performed for a set period, such as, for example, three minutes, on a grid comprising p computers.

A production window selection threshold is then determined. For that purpose, the number of points (that is, the size) and lift are recovered for each production window. In this example, the 100 best windows obtained allow a selection threshold of windows of minimum size and lift to be determined for the windows that will be retained at the end of the method.

Figure 3:
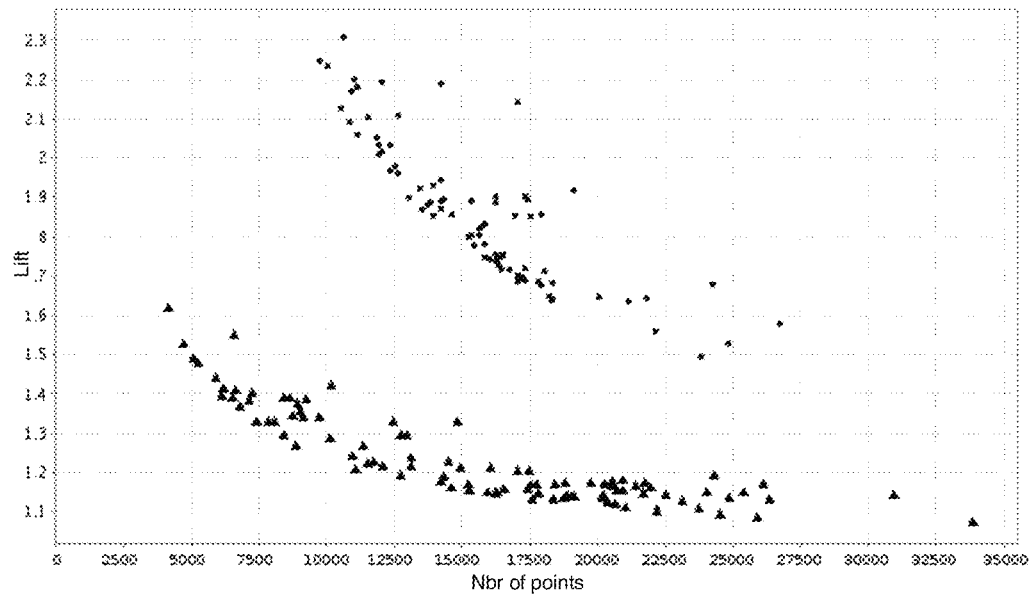
FIG. 3 shows a graph which represents an example of the change in the lift of the production windows depending on their size.

FIG. 3 illustrates, based on the data collected in phase I according to this example, a curve representing the lift of the production windows depending on their size. It should be noted that the production windows indicated by triangles on the curve are determined after the quality of the target improvement has been redistributed. Thus, these windows are only mathematical objects without any physical value. The distance between the populations represented respectively by triangles and circles allows the response rate of the database to be evaluated.

Second Phase: New Distributed Calculations

A massive calculation of production windows is performed for a set period, such as, for example, three minutes, on a grid comprising p computers. For each window, the combination of values of implemented parameters is recovered.

Third Phase: Convergence

Clustering is performed. For example, two clusters are formed according to the frequency of occurrence of parameter combinations, with half of the computers contributing to one of the clusters, and the other half to the other cluster. The convergence rate between the two clusters is determined as the percentage of common combinations at the top of the list of clusters. In this example, the twenty most frequent combinations are considered. This number is preferably configurable. If the convergence rate is less than a set objective, such as, for example, 90%, a new second distributed calculation phase is started. Otherwise, the step of obtaining results can then be performed.

At the end of the method, the over-performing production windows are displayed and/or kept and/or provided to the user or to another device for later use.

Optimization Function (Scoring) of the Production Windows

Various functions for optimizing the production windows may be used. The functions can take into account the size, the lift, the "odds ratio", the average, the standard deviation but also other criteria such as the window performance stability. The choice of the optimization function may significantly influence the result. For example, the alternative optimization functions presented hereafter can lead to sometimes very different results. This allows the user to favor certain areas of work rather than others.

The following concepts relating to the optimization functions are first established:

Maximum lift: certain production windows include only good productions. In this case, the improvement (and therefore lift) is at its maximum. The maximum lift is the inverse of the proportion of good productions in the dataset.

Size of the production window: number of productions performed in the production window.

Purity: the proportion of good productions in the production window.

Size-lift optimization function:

(Lift of the production window/Maximum lift)×(Size of the production window/Total number of data items)=Proportion of good productions in the production window×(Size of the production window/Total number of data items)

The table below shows an example with parameters such as velocity, strain, brightness, thickness, strength, etc., in a method such as that shown in FIG. 1.

| Batch No | Velocity | Strain | Concentration | Brightness | Thickness | Strength | ... |
|---|---|---|---|---|---|---|---|
| 1 | 1230 | 14.785 | 0.04528 | 23.251 | 0.09523 | 1.215478996 | |
| 2 | 1234 | 15.234 | 0.04236 | 27.123 | 0.10235 | 0.845214587 | |
| 3 | 1228 | 13.256 | 0.05214 | 21.253 | 0.08852 | 1.235215458 | |
| 4 | 1233 | 15.452 | 0.03789 | 22.326 | 0.09231 | 0.912457874 | |

Improvement goal/target: Brightness greater than 23. Batches 1 and 2 are good. The maximum number of good points is therefore 2.

Initial setup: there are 50% of good productions in the investigated data and it is possible to improve this proportion by a factor of 2. Therefore, the maximum value of lift is 2.

Production window: Strain between 14.785 and 15.452 and concentration between 0.04236 and 0.05214. This production window contains points 1 and 2 only, or 100% of good productions. It therefore shows an improvement of 2 with respect to the general population. The maximum lift is therefore reached in this case. The window furthermore includes half of the batches. A size-lift optimization function of 0.5 may be attributed.

$$\frac{Nbr \text{ of batches in the window}}{\text{Total } Nbr \text{ of batches}} \times \frac{\text{Lift of the window}}{\text{Maximum lift}} =$$

$$\frac{2}{4} \times \frac{2}{2} = 0.5$$

Robustness Function of the Production Window with Respect to the Variability of Another Variable The robustness of the production window is characterized with respect to a parameter such as the extent ratio (spread between control limits or difference between the extreme values) of said parameter in the production window versus the original data set.

For the particular case of timestamp parameters, these are replaced by numerical values. For example, the value 0 corresponds to the oldest date of the data set, with each subsequent value being the time elapsed since the value 0 (for example, in seconds). A conventional numerical parameter is obtained with respect to which the robustness of the production window may be calculated. Date type parameters are particularly useful for assessing the consistency of the production window performance over time.

Production Window Robustness Function with Respect to the Variability of a Set of Variables This function is the product of the robustness with respect to each of the parameters in a set of parameters. The parameters forming the set may be determined, for example, through hierarchical clustering (for example, using Pearson's correlation coefficients) or by carrying out a principal component decomposition of the data set.

Robustness Function with Respect to the Non-Fulfillment of the Production Window It is possible to assign each parameter of a production window the loss of performance in the case of non-fulfillment of said parameter. This is referred to as the parameter's weight in the window. It is sufficient to compare the lifts of the production windows with and without the tested parameter. The smaller the weight of a parameter, the stronger the improvement related to the production window with respect to its non-fulfillment. It may be desired to have the smallest possible (search for robust complementarities) average weight or on the contrary, the highest possible (search for strong interactions) average weight within the rules.

Combined Optimization Functions

It is possible to use the product of a performance optimization function, for example size-lift or size-average, multiplied by a robustness function, as the optimization function.

Other Criteria (Constraints)

Additional production window optimization criteria (constraints) may be employed, for example by imposing target values to statistics relating to the other variables in the production window. For example, it may be imposed that a velocity should imperatively have a minimum average value in the production window. Windows that do not meet constraints are eliminated by the diagnostic device.

Addition of a Neutral Area in Order to Calculate the Lift

In the above, for the determination of the lift, it was considered that the production could be only good or bad. However, it is also possible to create a border area between these two populations. A third population of acceptable productions is thus created. When the calculations are carried out, these points can be integrated without any restriction to a production window but are not taken into account, or are taken into account in a modulated manner for the optimization function.

The figures and their descriptions presented above illustrate rather than limit the invention. In particular, the invention and its various alternative embodiments have been described in relation to a particular example for an industrial process in the field of paper production. Nevertheless, it will be apparent to those skilled in the art that the invention can be extended to other embodiments, other types of process, with a very wide range of potential applications.

The reference numerals used in the claims are in no way limiting. The verbs "comprise" and "include" do not exclude the presence of items other than those listed in the claims. The word "a" preceding an item does not exclude the presence of a plurality of such items.

The invention claimed is:

1. A method for automatically characterizing a process for manufacturing an industrial compound, wherein a plurality of technical data relating to at least one of a process state, a process material, and a process performance is available, comprising the steps of:
a) measuring, on an object manufacturing line, using a sensor, a plurality of data relating to a plurality of parameters related to at least one of the process state, the process material, and the process performance;
b) receiving, by an interface module of an automatic characterization device, the data;
c) receiving, by the interface module of the automatic characterization device, at least one of the plurality of parameters as a target improvement for the process;
d) receiving, by the interface module of the automatic characterization device, a process optimization function;
e) performing, by a computational grid comprising a plurality of processors, for a period determined by a calculation end criterion, a first characterization phase of the process to achieve characteristics of potential manufacturing windows;
f) based on the characteristics of the best manufacturing windows obtained in the first characterization phase, determining, by a window selection threshold determination module of the automatic characterization device, a manufacturing window selection threshold;
g) performing, by the computational grid, a second characterization phase of the process to achieve parameter combinations for the manufacturing windows within limits of an established threshold;
h) distributing, by a clustering module of the automatic characterization device, the parameter combinations among several combination clusters;
i) checking, by a convergence module of the automatic characterization device, the convergence rate between the plurality of combination clusters according to a target rate;
j) if the target rate has not been reached, returning the method to "g"; and
k) if the target rate has been reached, obtaining variation ranges of the parameter combinations for the manufacturing windows of the process which meet a convergence criterion.

2. The method of claim 1, wherein at least one portion of the method is distributed over a plurality of computers which are linked together.

3. The method of claim 1, wherein the process optimization function comprises a lift to be maximized.

4. The method of claim 1, wherein the process optimization function comprises an average of a target value.

5. The method of claim 1, wherein the calculation end criterion is previously defined.

6. The method of claim 1, further comprising:
receiving a calculation end criterion.

7. The method of claim 1, wherein a determination of a window selection threshold is performed automatically by a threshold determination module, which receives the characteristics of the potential manufacturing windows and returns at least one value for the manufacturing window selection threshold.

8. The method of claim 1, further comprising:
after performing the first characterization phase, providing, by the interface module of the automatic characterization device, the characteristics of the potential manufacturing windows, and
receiving in return, by the interface module of the automatic characterization device, at least one value for the manufacturing window selection threshold.

9. The method of claim 2, further comprising:
designating one of the computers as a management module.

10. The method of claim 1, wherein the performing of the first characterization phase and the performing of the second characterization phase take place at least partially concurrently.

11. A device for automatically characterizing an evolutive industrial process for implementing the method of claim 1, comprising a plurality of operations for production of a given industrial compound, for which a plurality of state or characterization technical data is available, the device comprising:
- at least one microprocessor and one memory;
- an interface module, for receiving and transmitting data;
- a counter module, for verifying whether a calculation end criterion has been reached, and stopping calculations when the calculation end criterion has been reached;
- a management module, for managing operations and data exchanges between different modules;
- a computational grid, comprising a plurality of production window calculation modules, for carrying out in parallel in a substantially short period of time a substantially large number of operations on a substantially large number of data items from the industrial process to be diagnosed, to determine appropriate production windows;
- a window selection threshold determination module, for determining a threshold based on which the potential manufacturing windows are retained in the second characterization phase;
- a clustering module, for distributing parameter combinations among the several combination clusters to perform convergence calculations; and
- a convergence module, for verifying whether an expected convergence rate between the several combination clusters has been reached.

12. The device of claim 11, wherein the calculations are unsupervised.

13. The device of claim 11, wherein the computational grid is scalable.

14. The device of claim 13, wherein the computational grid includes at least one node to which a plurality of microprocessors are associated.

15. The device of claim 11, further comprising a fragmentation module, for distributing the calculations between a plurality of production window calculation modules.

* * * * *